United States Patent Office 2,841,678
Patented July 1, 1958

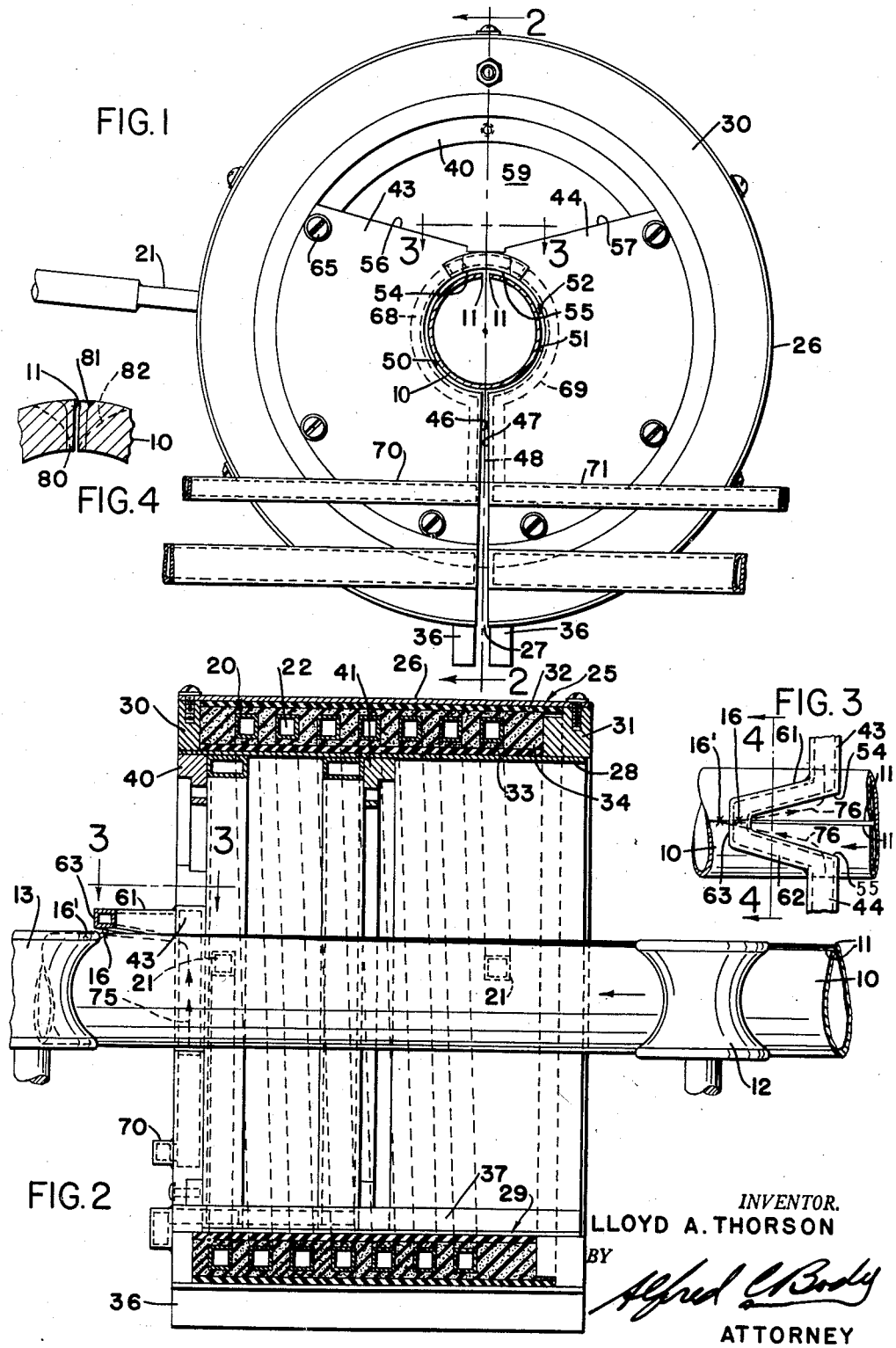

2,841,678

HIGH-FREQUENCY INDUCTOR ARRANGEMENT FOR CONTINUOUS SEAM WELDING

Lloyd A. Thorson, Cuyahoga County, Ohio, assignor to The Ohio Crankshaft Company, Cleveland, Ohio, a corporation of Ohio Application March 21, 1955, Serial No. 495,527

5 Claims. (Cl. 219—8.5)

This invention pertains to the art of high-frequency induction heating and, more particularly, to a high-frequency inductor arrangement for continuously heating the edges of a C-shaped tube as they are brought together to be welded into a solid tube.

It has long been known to employ high-frequency induced electrical energy for the purpose of continuously heating the edges of a C-shaped tube to the welding temperature so that they can be welded. Thus, in the British patent to MacLaren, No. 377,655, dated January 21, 1931, there is shown a multiturn coil energized from a high-frequency power source and surrounding a continuously moving, C-shaped tube having slightly spaced edges. As the tube moves beyond the exit end of the coil and the magnetic field thereof, these edges are brought together in a continuous and progressive fashion. High-frequency voltages induced in the tube by the high-frequency currents in the coil cause high-frequency currents to flow circumferentially around the tube, underneath the coil, thence axially along the edges and across the edges at the point where they are being brought into engagement. As the point of engagement is spaced from the coil edge, these currents crowd around the point and thus concentrate to provide a rapid heating action. The currents at any one instance are flowing in opposite directions along the edges to and from the point of engagement of the edges beyond the exit end of the coil. Because of known characteristics of the flow of high-frequency currents, these currents tend to slightly crowd the edges because of their opposite direction of flow and thus slightly preheat the edges. Thus, the total amount of heat which must be supplied at the exact point of bringing the edges together is somewhat decreased. As will appear later, not all of the currents flowing underneath the coil appear across the edges but are wasted elsewhere in the tube.

The method and apparatus described in the British patent to MacLaren produced satisfactory tubing but not at satisfactory tube speeds. One of the reasons why the speeds were unsatisfactory is that at the time when MacLaren made his development, high-frequency power sources were not available, capable of generating substantial amounts of power. As the speed of the weld is proportional to the amount of available power, it is readily apparent why the apparatus of MacLaren never came into substantial use.

This is not to deny that high-frequency power sources having high power capabilities were then available. However, all of such power sources were of the type used in radio transmission. Large power sources of the type suitable for use in industrial plants were relatively unknown.

In the art of high-frequency induction heating, the matching of the impedance of the workpiece to be heated to the impedance of the power source has always been a problem. This is particularly so with power sources which produce the higher frequencies; that is, on the order of 300,000 cycles and up. Such power sources are ordinarily of the electronic, vacuum tube or spark-gap type. These power sources have a relatively high impedance. The load in most induction-heating problems, however, is a low impedance. Unless proper impedance matching is obtained, inefficient transfer of power from the power source to the load results. This problem is particularly apparent wherein the load is a split small diameter tube.

In order to provide such impedance matching, it has been conventional in the past to employ so-called flux concentrators. Such concentrators ordinarily consist of a split ring of electrically conductive metal such as copper having an inner diameter close to the outer dimension of the workpiece and an outer diameter so as to fit into and be closely coupled with a surrounding multiturn coil. Such flux concentrators are, of course, well known and they enable the matching of relatively high-impedance, high-frequency power sources to relatively low-impedance small diameter loads. In effect, the flux concentrator may be described as a blocking shield, causing all of the flux of the multiturn coil to thread through the small-diameter workpiece. Alternatively, the flux concentrator may be considered as a matching transformer wherein the multiturn coil causes currents to flow in one direction on the outer surface of the split copper ring and in the opposite direction on the inner surface of such ring. A complete explanation of the operation of such concentrators may be found in the "Industrial Electronics Reference Book" published by The Westinghouse Corporation in 1946, pages 395 to 398.

Proximity effect also has an important effect in high-frequency induction heating. By proximity effect is meant that when a conductor carrying high-density electric currents is placed adjacent to another metallic surface such as a workpiece, currents will be induced in such workpiece and will also be concentrated directly underneath the inducing conductor. Thus, in the disclosure of MacLaren or with a flux concentrator, currents in the inductor cause a circumferential current flow in the surface of the tube being welded and because of this proximity effect, such currents remain under the inducing member for most of the tube circumference. However, as the currents approach the spaced edges, they branch out from under the inducing member taking whichever is the lowest impedance electrical circuit. The benefits of the proximity effect are thus lost. The current thus divides. Some current flows around the back side of the tube spaced axially from the limits of the coil. These currents are wasted insofar as the welding operation is concerned. Other currents tend to flow longitudinally of the tube toward the point where the edges are being brought together. At this point an arc is formed which heats the edges to the fusion point in a very short space. The edges are then held in engagement until the fused metal again solidifies and the weld is completed.

It is to be noted that these currents which flow toward the point of bringing the edges together tend to remain on the outer surface of the skelp due to what is known as the "skin effect" of high frequency currents. While there is some tendency for the current to heat the edges it is generally only the outer corners thereof. Because of the skin effect there is no penetration into the surface of the skelp or, particularly, across the edges.

The present invention contemplates a high-frequency inductor arrangement and method of welding the edges of a continuously moving C-shaped metallic tube as such edges are continuously brought together at a predetermined point in the path of travel of the tube, which arrangement and method overcomes all of the above referred to objections and others, is simple and rugged in construction, gives excellent electrical efficiency and improved impedance-matching between the high-frequency power source and the tube load.

In accordance with the invention, a high frequency inductor is provided which encircles the tube in advance of the point of bringing the edges together, which inductor has portions extending in the direction of movement to a position generally over or just in advance of the point of bringing the edges together, which portion controls the flow of currents in the tube by proximity effect at all times up to and generally including the point of the welding.

Further in accordance with the invention, a method of seam welding is provided wherein currents are induced to flow in the tube such that the edges are heated uniformly across the width thereof up to and at the point of engagement.

Further in accordance with the invention, a method of continuous seam welding is provided which heats the edges to be welded to the forge welding temperature so fast that oxides do not have an opportunity to form thereon and a forge weld may be readily obtained even with aluminum, copper, stainless steel and the like.

Still further in accordance with the invention, an inductor arrangement is provided comprised of a pair of coplanar plate-like members of electrically conductive material having opposed spaced edges including a first portion close spaced and parallel to define a split remote from the tube edges, a second portion diverging to define a tube opening and terminating from 15° to 90° short of the tube edges, and a third portion diverging from the termination point of the second portion, the termination point being inter-connected by generally axially extending conductors converging generally over the point of bringing the edges together. A generally C-shaped shell of electrically conductive material having a split coincident with the split between the plates surrounds the plates and tube and is electrically connected to the outer edges thereof. A multi-turn coil surrounds such shell and is in inductive relationship therewith.

Still further in accordance with the invention, a pair of C-shaped metallic shells electrically interconnected around their periphery at one end are disposed one on each side of the multi-turn coil and completely enclosing same. Maximum coupling both inductively and capacitively between the shells which form the secondary and the multi-turn coil, which forms a primary, results. Also the presence of the metallic shells in close proximity to the coil effectively reduces the coil inductance and an increase of amperes per turn in the coil can be obtained.

The principal object of the invention is the provision of a new and improved high-frequency inductor arrangement for heating the edges of a C-shaped tube to the welding temperature which is electrically efficient, simple in construction and provides an optimum impedance transformation.

Another object of the invention is the provision of a new and improved method of heating and inductor arrangement which heats the edges uniformly across their entire width.

Another object of the invention is the provision of a new and improved inductor arrangement which will have a minimum inductive reactance as seen by the power source and will have a maximum transfer of power from the power source to the load.

Still another object of the invention is the provision of a new and improved high-frequency inductor arrangement of the type described which induces currents to flow generally circumferentially of the tube to a point spaced from the edges, thence longitudinally of the tube to the point where the edges are being brought into electrical engagement which controls the flow and direction of such currents throughout the entire current path by means of the proximity effect.

Another object of the invention is the provision of a new and improved high-frequency inductor arrangement for heating the edges of a continuously-moving, C-shaped tube at a point where such edges are brought together by flowing currents between such edges comprising a multiturn helical coil, a split sleeve internally of such coil having spaced edges, a transverse plate member in the sleeve generally filling the opening thereof and connected at its edges to the sleeve, the member having a tube-receiving opening for passing such tube, the opening being defined by surfaces terminating circumferentially short of the edges and having converging members from each surface extending in the direction of movement of the tube for directing the flow of current induced in the tube over a predetermined path.

Still another object of the invention is the provision of a new and improved inductor for continuous seam welding of C-shaped tube into pipe which has a maximum efficiency and substantially eliminates undesired current flow in back portions of the tube.

The invention may be embodied in certain parts and arrangements of parts, preferred embodiments of which will be described in detail in this specification and illustrated in the accompanying drawings which are a part hereof, and wherein:

Figure 1 is an end elevational view of a high-frequency inductor arrangement illustrating a preferred embodiment of the invention;

Figure 2 is a cross-sectional view of Figure 1 taken approximately on the line 2—2 thereof and, in addition thereto, shows schematically the rolls of a conventional tube-welding machine for advancing the tube to be welded through the inductor arrangement;

Figure 3 is a fragmentary sectional view of Figures 1 and 2 taken approximately on the line 3—3 thereof; and Figure 4 is a sectional view of Figure 3 on the line 4—4 thereof showing the heating patterns obtainable with the present invention.

Referring now to the drawings, wherein the showings are for the purposes of illustrating the preferred embodiment of the invention only and not for the purposes of limiting the invention, the figures show a C-shaped tube 10 having spaced edges 11 to be welded being advanced from right to left through a high-frequency inductor arrangement as will be described. The tube 10 is controlled and guided in its movement by rolls 12 in advance of the inductor arrangement and rolls 13 beyond the exit end of the inductor arrangement. Such rolls 12 and 13 are conventional as they are usually found in continuous seam-welding apparatus and will not be described further herein. If desired, a seam guide, not shown, may be provided in advance of the inductor arrangement shown. The rolls 13 are adjusted so as to forcefully bring the edges 11 together at a fixed point in the path of movement of the tube 10. Such fixed point is indicated generally by the reference numeral 16 in Figure 3, and its exact position may be varied slightly as shown at 16' generally in the direction of movement of the tube 10. The amount of pressure exerted on the edges 11 by the rolls 13 will be that required to bring the edges into firm abutting engagement sufficient to effect the desired weld without creating too large a bead.

The high-frequency inductor arrangement shown is comprised generally of a relatively large-diameter helical coil 20 formed from rectangular copper tubing, the ends of such coil forming terminals 21 which connect to a source of high-frequency electrical current, not shown. Also, means, not shown, but conventional in the art can be provided for circulating cooling medium through the hollow passage 22 of the tubing making up the coil 20. Seven turns are shown as making up the coil 20. Obviously, more or less turns may be employed as desired to effect the desired impedance transformation from the power source, not shown, to the tube 10. A C-shaped shell indicated generally at 25 completely surrounds the helical coil 20 except for the openings required to pass the terminals 21. This shell, in the embodiment shown, is comprised of an outer split sleeve 26 having a gap 27 located at the lower edge, an inner split sleeve 28 also having a gap 29 at its lower edge and coinciding with the gap 27 of the outer sleeve and end rings 30, 31 mechanically and electrically interconnecting the axial edges of the sleeves 26, 28. The rings 30, 31 also have gaps or splits coinciding with the gaps or splits 27, 29 of the outer and inner sleeves 26, 28 to form a C-shaped shell 25 completely enclosing the coil 20. Electrical insulation 32 and 33 and an impregnating compound of electrically insulating material 34 space and electrically insulate the coil 20 from the outer surrounding shell 25. It will be noted that the coil 20 and the insulating material extends across the gaps in the shell 25.

Current-carrying bars 36 are suitably fixed to the outer surface of the shell 25 immediately adjacent to the space 27 and extend along the edges defining the space 27 for the entire length thereof. In a like manner, heavy bars 37 extend along the inner surface of the inner shell 28 in spaced relationship on both sides of the edges of the shell 28 defining the space 29 to provide extra amounts of copper at this point to carry the large currents normally involved in induction heating.

In the embodiment of the invention shown, a pair of C-shaped rings 40, 41 are mounted on the inside of the shell 28 and suitably fixed thereto by brazing or the like. The ring 40 is shown as being at the left-hand end of the inner sleeve 28 while the ring 41 is generally midway of the length of the sleeve 28. These rings 40, 41 provide mounting means for metallic plates 43, 44 which substantially fill the internal opening of the shell 25.

The plates 43, 44 have a pair of close-spaced parallel surfaces 46, 47 respectively defining therebetween a space 48 which communicates with the spaces 27, 29. The members 43, 44 also have generally arcuate surfaces 50, 51 defining a tube or work-piece-receiving space 52. The surfaces 50, 51 are arcuate because the outer surface of the tube 10 in the embodiment shown is arcuate. Obviously, if other shapes of tubes were employed, the surfaces 50, 51 would be likewise shaped. It will be noted that the space 48 communicates into the tube-receiving opening 52. The surfaces 50, 51 terminate at points 54, 55 respectively short or spaced from the tube edges 11. Immediately above the points 54, 55, the surfaces 56, 57 of the plates diverge outwardly defining with the inner surface of the sleeve 28 a generally pie-shaped opening 59.

Extending axially from the points 54, 55 and in the direction of movements of the tube 10 are a pair of generally converging members 61, 62, which members meet with a short transverse portion 63 generally located over or close to the point 16. Generally, the members 61, 62, 63 form a V-shaped axial extension from the plates 43, 44 in close-spaced relationship to the surfaces of the tube converging from the point spaced from the edges to a point immediately over the edges over the point 16 where the edges are initially brought into abutting engagement. As shown, the plates 43, 44 are fastened to the ring 40 by means of screws 65. Obviously, other fastening means could be employed if desired.

It will be appreciated that the members 26, 28, 30, 31, 43, 44, 61, 62 and 63 are all formed of high-conductivity material such as copper or the like. If desired, the surface can be silver plated, but this is generally not found to be necessary.

The members 61, 62 and 63 are preferably hollow copper tubes. The interior of these tubes communicate with passages 68, 69 formed in the plates 43, 44 respectively which parallel the surfaces 50, 51; 46, 47 whereby cooling water may be circulated through the members 43, 44 parallel to the surface. Tubes 70, 71 provide an inlet and outlet passage to the tubes 68, 69. The passages 68, 69 may be formed in any desired manner which form no part of the present invention. Other cooling means may be provided for the inductor arrangement if desired.

In the embodiment shown in Figure 2, the plates 43, 44 are mounted on the left-hand ring 40. In some instances, it has been found desirable to mount the plates 43, 44 on the ring 41 so that the members 61, 62 and 63 are entirely enclosed within the limits of the coil 20.

With the arrangement of the invention shown, it will be appreciated that by providing sets of plates 43, 44 having different sized tube-receiving openings 52 therein, the inductor arrangement may be rapidly accommodated to take care of a maximum number of sizes of tubes 10 with a minimum of equipment.

The members 61, 62 and 63 have been shown in generally a V-shape. It will be appreciated that, in some instances, they can be in a U-shape with the legs 61, 62 parallel to each other. The lower surfaces of these members are also in close-spaced relationship to the surfaces of the tube 10. Normally, the spacing between the members 61, 62 should be in excess of the spacing of the members from the surfaces of the tube.

If desired, magnetic material may be placed about the members 61, 62 and 63 so as to further increase the magnetic coupling of the members with the tube itself. It will be noted, however, that the point 16, 16' is directly within the magnetic field of the members 61, 62 and 63.

It will be noted that the current path formed by the surfaces 56, 57 and the arc on the interior surface of the sleeve 28 is in parallel with the current path through the members 61, 62 and 63. It is desirable that this current path thus be made as long as possible to prevent the by-pass of current therethrough.

Thus, the surfaces 56, 57 may, if desired, diverge to an even greater extent than that shown in the drawing or may be substantially eliminated entirely by forming the surfaces 46, 50, 51 and 47 out of the continuous length of copper tubing.

The axis of the opening 52 has also been shown as coaxial with that of the shell 25. Obviously, this axis may be eccentrically positioned to the axis of the shell 25. If such eccentric positioning is employed, however, such eccentricity would be in the direction of moving the axis of the tube opening 52 downwardly as shown in Figure 1. This would inherently increase the length of the current path 56, 57 and the inner arc of the shell 28, thus providing for a less by-passing of the current through this path and allowing a greater percentage of the current to flow to the members 61, 62 and 63.

The plate numbers 43 and 44 are shown in the drawings as having their plane perpendicular to the line of movement of the tube path. It will be appreciated that if desired the angle of these plates could be disposed at an angle other than perpendicular to the path of movement of the tube. The slope of such plates would obviously be with the upper edge in the direction of movement. With such an arrangement the length of the conductor members 61, 62 could probably be much shortened.

In the preferred embodiments the arcuate surfaces 50, 51 envelop approximately 330° of tube 10. Obviously the angle of envelopment may vary as desired and in some instances the envelopment of the surfaces 50, 51 may only be 180° circumferential extent while the axially extending V-portion envelops the remainder of the tube tap. Thus in accordance with the invention the termination point 54, 55 of the arcuate surfaces 50, 51 may be spaced from the edges 11 by an amount varying from 90° down to 10°, although generally the actual arc of spacing will be between these limits.

In operation, high frequency currents flowing in the coil 20 induce similar high frequency currents to flow in the inner and outer shells 26, 28. These currents flow circumferentially to the gap 27 thence longitudinally along the gap to the edges 46, 47. They then flow in opposite directions along these edges at any one instant and around the tube receiving opening shown. In particular the currents, when they reach the member 61, 62, flow in a generally converging direction toward the point 16 where the edges first engage.

These currents flowing around the tube opening and in the portion 61, 62 induce current to flow in the surfaces of the tube 10.

Because of proximity effect these currents remain directly under the current-carrying surfaces of the inductor. Thus the currents will flow circumferentially of the tube to a point spaced from the edges 11. Thence the currents must flow because of the proximity effect in a generally converging direction on the point 16. Because of the proximity effect of the inductor, these currents cannot spread out circumferentially in the tube. Their path is very closely defined. There is a slight tendency, however, for the currents induced by the portions 61, 62 to be drawn inwardly toward the edges 11.

It is to be noted that as the surfaces or edges of the tube heat, the current instead of spreading out circumferentially penetrates deeper. This is so because the depth of penetration of the current is proportional to the resistance of the metal and as the metal heats the resistance goes up, and thus the penetration increases. In the absence of the proximity effect the currents would spread out circumferentially as in the prior art. Photomicrographs of heated specimens indicates that the heating pattern is similar to that shown in Figure 4. Thus the heating pattern is generally uniform across the entire width of the edges 11, substantially as is shown at 80. At the outer corners of the edges there is a slight circumferential widening of the heat pattern as shown at 81, but this is not serious. This heat pattern may be generally distinguished from the heat pattern indicated generally by dotted lines 82 which is that generally obtained using the disclosure of the MacLaren patent wherein the currents at the actual point of welding are flowing along the lowest impedance path in the tube rather than having their path of flow controlled by proximity effect as in accordance with the present invention. It will be noted that with the heat pattern as obtained by the dashed lines 82 the innermost corners of the edges 11 will not be substantially heated. Thus an arcing action must take place to heat these edges to the welding temperature. Such arcing action tends to fuse or melt the outermost corners of the edges.

In accordance with the present invention, however, the edges are heated uniformly across their entire width to a very shallow depth, and, what may be termed a forge weld is obtained. Photomicrographs of a finished weld specimen shows that the edges at no point have been brought to the fusion temperature.

Part of this ability to obtain a forge weld with aluminum, copper, brass, and the like, may be explained by the fact that the heating of the edges takes place in approximately a distance of 1 to 1½" with a tube moving at speeds in excess of 100 feet per minute. Thus the edges are exposed to the atmosphere in a heated condition for times less than 1/20 of a second.

Another reason why it is believed that the present invention has been successful is that the formation of an arc between the edges is substantially prevented. In order to establish an arc between the edges as they are brought together, a potential must be established in excess of the ionization potential of the air or other gas which is in the gap between the edges. The present inductor arrangement prevents the formation of such potentials. Thus, around the surfaces 50, 51, and the portions 61, 62 of the inductor there is a definite fixed voltage relationship per unit length of surface facing the tube 10.

Because of the proximity effect, this voltage relationship is substantially held in the surfaces of the tube. Thus, at no time can a voltage develop across the edges 11 greater than the ionization potential of the heated air in the gap between the edges to thus form an arc.

It will thus be seen that improved apparatus and method for continuously welding the edges of a C-shaped tube is provided as such tube is moved along a predetermined path of movement and the edges brought together at a predetermined point in such path.

It will be further noted that the inner and outer shells, 28 and 26, provide a maximum degree of both inductive and capacitive coupling with the coil 20. The mutual inductance is a maximum. Further, the close proximity of the shells effectively reduces the inductance of the coil 20 for a given number of turns. It is thus possible to obtain increased current flowing through the coil 20. The result is a greater current flowing into the shells 28, 26 and a greater current available around the tube being welded, to induce higher currents in this tube.

Obviously, modifications and alterations will occur to others upon a reading and understanding of this specification. It is my intention to include all such modifications and alterations insofar as they come within the scope of the appended claim.

Having thus described my invention, I claim:

1. A high-frequency inductor arrangement for inducing welding currents to flow in the sides of and between the edges of a continuously moving C-shaped metallic tube as such edges are continuously brought together at a pre-determined point in the path of travel said arrangement comprising in combination a pair of coplaner plate like members having spaced edges including a first portion closed spaced and parallel to define a split remote from the tube edges, a second portion diverging to define a tube receiving opening terminating from 15° to 90° short of the tube edges and a third portion diverging from a termination point of the second portion, the termination point being inter-connected by a generally axially and arcuately extending conductors converging generally over the point of bringing the edges together.

2. A high-frequency inductor arrangement for inducing welding currents to flow in the sides of and between the edges of a continuously moving C-shaped metallic tube as such edges are continuously brought together at a pre-determined point in the path of travel said arrangement comprising in combination a pair of coplaner plate like members having spaced edges including a first portion closed spaced and parallel to define a split remote from the tube edges, a second portion diverging to define a tube receiving opening terminating from 15° to 90° short of the tube edges and a third portion diverging from a termination point of the second portion, the termination point being inter-connected by a generally axially and arcuately extending conductors converging generally over the point of bringing the edges together, a generally C-shaped shell having a split coinciding with the split between the plates surrounding the plates and electrically connected to the outer edges thereof and a multi-turn coil surrounding said shell.

3. A high-frequency inductor arrangement for inducing welding currents to flow in the sides of and between the edges of a continuously moving C-shaped metallic tube as such edges are continuously brought together at a pre-determined point in the path of travel said arrangement comprising in combination a pair of coplaner plate like members having spaced edges including a first portion closed spaced and parallel to define a split remote from the tube edges, a second portion diverging to define a tube receiving opening terminating from 15° to 90° short of the tube edges and a third portion diverging from a termination point of the second portion, the termination point being inter-connected by a generally axially and arcuately extending conductors converging generally over the point of bringing the edges together, a generally C-shaped hollow shell having a split coinciding with the split between said plate and surrounding said plate and electrically connecting the outer edges thereof and a coil within said shell having a plurality of turns.

4. A high-frequency inductor arrangement for inducing welding currents to flow in the sides of and between the edges of a continuously moving C-shaped metallic tube where such edges are continuously brought together at a pre-determined point in the path of travel comprising in combination a multi-turn helical coil of a diameter substantially larger than the diameter of the tube to be welded, a C-shaped member having a longitudinal split of an electrically conductive material internally of and coaxial with the multi-turn coil, a pair of coplaner plate members extending generally transversely of said shell, said plate members having opposed edges comprised of first portions closed spaced and communicating with the split of said shell. A second portion diverging to define a tube opening and terminating from 15° to 90° short of the tube edges and a third portion diverging from the termination point outwardly to the inner surfaces of said shell, and axially and arcuately extending conductors converging generally over the point of bringing the edges together and interconnecting the termination point to complete the tube receiving opening.

5. A high-frequency inductor arrangement for inducing currents to flow between the edges of a continuously moving C-shaped tube as said edges are brought into engagement comprising a multi-turn coil and an electrically conductive member inside of said coil and having an outer surface of approximately 355° to 359° extent, a first pair of internal surfaces defining a split communicating with the exterior of said member, a second pair of internal surfaces defining a portion only of a workpiece receiving opening and of configuration to closely conform to the shape of the tube being welded, said split communicating with said opening, and a third surface completing said workpiece opening and of a configuration to be substantially spaced from the tube surfaces but symmetrical with the split thereof, and a U-shaped conductor means inter-connecting the intersection of said second and third surfaces and extending axially of the tube in the direction of movement thereof.

References Cited in the file of this patent

UNITED STATES PATENTS

| | | |
|---|---|---|
| 1,363,159 | Murray et al. | Dec. 21, 1920 |
| 1,435,306 | Johnston | Nov. 14, 1922 |
| 2,080,400 | Fredrickson | May 18, 1937 |
| 2,209,637 | Sessions | July 30, 1940 |
| 2,485,843 | Pinkney | Oct. 25, 1949 |
| 2,666,831 | Seulen et al. | Jan. 19, 1954 |
| 2,697,772 | Kinghorn | Dec. 21, 1954 |

FOREIGN PATENTS

| | | |
|---|---|---|
| 377,655 | Great Britain | Jan. 21, 1931 |
| 616,117 | Great Britain | Jan. 17, 1949 |
| 716,378 | Great Britain | Oct. 6, 1954 |